(12) United States Patent
Huang et al.

(10) Patent No.: US 10,122,996 B2
(45) Date of Patent: Nov. 6, 2018

(54) METHOD FOR 3D MULTIVIEW RECONSTRUCTION BY FEATURE TRACKING AND MODEL REGISTRATION

(71) Applicant: SONY CORPORATION, Tokyo (JP)

(72) Inventors: Ko-Kai Albert Huang, Cupertino, CA (US); Ming-Chang Liu, San Jose, CA (US)

(73) Assignee: Sony Corporation, Tokyo (JP)

(*) Notice: Subject to any disclaimer, the term of this patent is extended or adjusted under 35 U.S.C. 154(b) by 132 days.

(21) Appl. No.: 15/291,714

(22) Filed: Oct. 12, 2016

(65) Prior Publication Data

US 2017/0264887 A1  Sep. 14, 2017

Related U.S. Application Data

(60) Provisional application No. 62/305,696, filed on Mar. 9, 2016.

(51) Int. Cl.
| | |
|---|---|
| *H04N 7/18* | (2006.01) |
| *H04N 13/282* | (2018.01) |
| *H04N 13/128* | (2018.01) |
| *H04N 13/243* | (2018.01) |
| *G06T 7/579* | (2017.01) |
| *G06T 7/593* | (2017.01) |
| *H04N 13/111* | (2018.01) |
| *H04N 13/239* | (2018.01) |
| *H04N 13/00* | (2018.01) |

(52) U.S. Cl.
CPC ........... *H04N 13/282* (2018.05); *G06T 7/579* (2017.01); *G06T 7/593* (2017.01); *H04N 13/111* (2018.05); *H04N 13/128* (2018.05); *H04N 13/239* (2018.05); *H04N 13/243* (2018.05); *G06T 2207/10021* (2013.01); *H04N 2013/0081* (2013.01)

(58) Field of Classification Search
CPC . G06T 2207/10021; G06T 2207/10028; G06T 2207/30244; G06T 7/004; G06T 7/2086; H04N 13/0022; H04N 13/0242; H04N 13/0282; H04N 13/0445; H04N 2013/0081
USPC .......................................................... 348/48
See application file for complete search history.

(56) References Cited

U.S. PATENT DOCUMENTS

| | | | | |
|---|---|---|---|---|
| 6,614,429 B1* | 9/2003 | Zhang | ............... | G06K 9/209 |
| | | | | 345/420 |
| 8,411,932 B2* | 4/2013 | Liu | ............... | H04N 13/0022 |
| | | | | 345/422 |
| 2008/0152213 A1* | 6/2008 | Medioni | ............. | G06K 9/00208 |
| | | | | 382/154 |

(Continued)

OTHER PUBLICATIONS

Boochs et al, Integration of knowledge to support automatic object reconstruction from image and 3D data (Year: 2011).*

(Continued)

*Primary Examiner* — Shan E Elahi
(74) *Attorney, Agent, or Firm* — Haverstock & Owens LLP (57) ABSTRACT

A 3D multiview reconstruction method takes a sequence of 2D stereo images from a narrow field-of-view imager (e.g., camera) and reconstructs a 3D representation of the wide field-of-view object or scene. The 3D multiview reconstruction method tracks 2D image pixels across neighboring frames and constraints for frame integration via 3D model construction.

21 Claims, 5 Drawing Sheets

(56) References Cited

U.S. PATENT DOCUMENTS

| | | | |
|---|---|---|---|
| 2008/0310757 A1 | 12/2008 | Wolberg et al. | |
| 2010/0014781 A1* | 1/2010 | Liu | H04N 13/0022 |
| | | | 382/285 |
| 2011/0221936 A1* | 9/2011 | Steinberg | G06K 9/0061 |
| | | | 348/241 |
| 2012/0027290 A1* | 2/2012 | Baheti | G06K 9/4671 |
| | | | 382/154 |
| 2012/0155750 A1* | 6/2012 | Kim | G06T 7/002 |
| | | | 382/154 |
| 2012/0176380 A1* | 7/2012 | Wang | G01B 11/2545 |
| | | | 345/420 |
| 2012/0206578 A1* | 8/2012 | Yang | H04N 13/0011 |
| | | | 348/47 |
| 2014/0043329 A1* | 2/2014 | Wang | G06T 17/20 |
| | | | 345/420 |
| 2014/0072205 A1* | 3/2014 | Ishii | G06T 15/08 |
| | | | 382/154 |
| 2014/0253695 A1* | 9/2014 | Kassouf | G02B 27/2214 |
| | | | 348/51 |
| 2014/0340489 A1 | 11/2014 | Medioni et al. | |

OTHER PUBLICATIONS

Peng et al, 3D Face reconstruction based on Multi-View stereo algorithm (Year: 2014).*

Jan-Michael Frahm, "3D Reconstruction of Architectural Scenes from Uncalibrated Video Sequences", pp. 7.

International Search Report and Written Opinion from PCT Application No. PCT/US17/20760.

* cited by examiner

METHOD FOR 3D MULTIVIEW RECONSTRUCTION BY FEATURE TRACKING AND MODEL REGISTRATION

CROSS-REFERENCE TO RELATED APPLICATION(S)

This application claims priority under 35 U.S.C. § 119(e) of the U.S. Provisional Patent Application Ser. No. 62/305,696, filed Mar. 9, 2016 and titled, "METHOD FOR 3D MULTIVIEW RECONSTRUCTION BY FEATURE TRACKING AND MODEL REGISTRATION," which is hereby incorporated by reference in its entirety for all purposes.

FIELD OF THE INVENTION

The present invention relates to imaging analysis. More specifically, the present invention relates to 3D imaging analysis.

BACKGROUND OF THE INVENTION

Typical human vision is limited by its field-of-view which usually covers only a narrow view of an entire scene. To be able to expand the field-of-view to have a broader knowledge of the environment or object, several views are used to reconstruct the environment inside one's mind. Similarly, for computer vision, a typical imager/camera only captures a limited portion of the object or scene of interest. By providing several shots of different views, the machine will have a broader understanding of the world around it, in 3D.

SUMMARY OF THE INVENTION

A 3D multiview reconstruction method takes a sequence of 2D stereo images from a narrow field-of-view imager (e.g., camera) and reconstructs a 3D representation of the wide field-of-view object or scene. The 3D multiview reconstruction method tracks 2D image pixels across neighboring frames and constraints for frame integration via 3D model construction.

In one aspect, a method programmed in a non-transitory memory of a device comprises acquiring one or more 2D stereo images, reconstructing a 3D multiview image using the one or more 2D stereo images and displaying the 3D multiview image. Acquiring the one or more 2D stereo images includes utilizing a plurality of cameras to capture the one or more 2D stereo images. Acquiring the one or more 2D stereo images includes downloading the one or more 2D stereo images from a server. The one or more 2D stereo images have a narrow field of view. Reconstructing the 3D multiview image includes: rectifying the one or more images, estimating a disparity between images, implementing 2D pixel tracking across neighboring frames, estimating a 3D pose by mapping tracked 2D pixels to 3D coordinates and constructing a 3D model based on the 3D pose. Reconstructing the 3D multiview image includes: selecting a frame of the one or more images for speedup, performing a noise check to discard an image of the one or more images if noise of the image is above a threshold and selecting a region of interest in the one or more images for speedup. The 3D image comprises a 3D surface. The 3D image comprises a 3D point cloud.

In another aspect, an apparatus comprises a non-transitory memory for storing an application, the application for: acquiring one or more 2D stereo images, reconstructing a 3D multiview image using the one or more 2D stereo images and displaying the 3D multiview image and a processing component coupled to the memory, the processing component configured for processing the application. Acquiring the one or more 2D stereo images includes utilizing a plurality of cameras to capture the one or more 2D stereo images. Acquiring the one or more 2D stereo images includes downloading the one or more 2D stereo images from a server. The one or more 2D stereo images have a narrow field of view. Reconstructing the 3D multiview image includes: rectifying the one or more images, estimating a disparity between images, implementing 2D pixel tracking across neighboring frames, estimating a 3D pose by mapping tracked 2D pixels to 3D coordinates and constructing a 3D model based on the 3D pose. Reconstructing the 3D multiview image includes: selecting a frame of the one or more images for speedup, performing a noise check to discard an image of the one or more images if noise of the image is above a threshold and selecting a region of interest in the one or more images for speedup. The 3D image comprises a 3D surface. The 3D image comprises a 3D point cloud.

In another aspect, a system comprises a plurality of cameras for acquiring one or more 2D stereo images and a computing device configured for: receiving the one or more 2D stereo images, reconstructing a 3D multiview image using the one or more 2D stereo images and displaying the 3D multiview image. Acquiring the one or more 2D stereo images includes utilizing a plurality of cameras to capture the one or more 2D stereo images. Acquiring the one or more 2D stereo images includes downloading the one or more 2D stereo images from a server. The one or more 2D stereo images have a narrow field of view. Reconstructing the 3D multiview image includes: rectifying the one or more images, estimating a disparity between images, implementing 2D pixel tracking across neighboring frames, estimating a 3D pose by mapping tracked 2D pixels to 3D coordinates and constructing a 3D model based on the 3D pose. Reconstructing the 3D multiview image includes: selecting a frame of the one or more images for speedup, performing a noise check to discard an image of the one or more images if noise of the image is above a threshold and selecting a region of interest in the one or more images for speedup. The 3D image comprises a 3D surface. The 3D image comprises a 3D point cloud.

DETAILED DESCRIPTION OF THE PREFERRED EMBODIMENT

A 3D multiview reconstruction method takes a sequence of 2D stereo images from a narrow field-of-view imager (e.g., camera) and reconstructs a 3D representation of the wide field-of-view object or scene.

Figure 1:
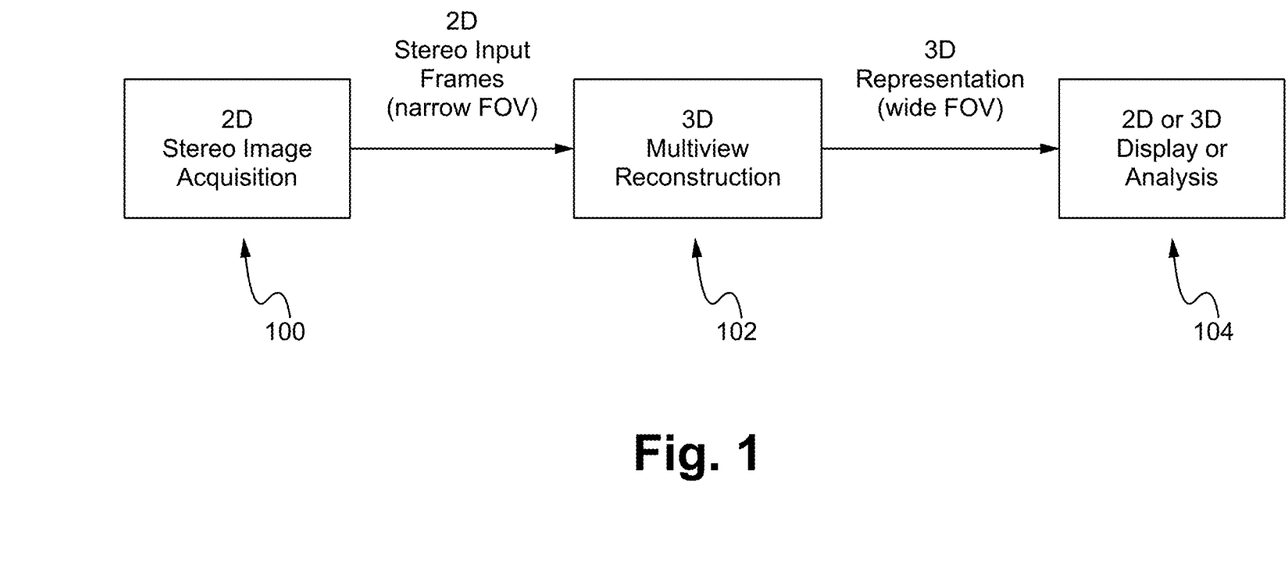
FIG. 1 illustrates a flowchart of the 3D multiview reconstruction method according to some embodiments.

FIG. 1 illustrates a flowchart of the 3D multiview reconstruction method according to some embodiments. In the step 100, 2D stereo images are acquired. The 2D stereo images are able to be acquired in any manner such as using one or more cameras to acquire the 2D stereo images or downloading the 2D stereo images from a device such as a server (e.g., in a cloud system or the Internet). In some embodiments, the 2D stereo images have a narrow Field of View (FOV). The 2D stereo images are from a plurality of angles of a desired object or scene (e.g., stereo images from a variety of angles so that each side of the object is captured—top, bottom, left, right, front, back and/or angles in between). In some embodiments, the 2D images are extracted from a video. In the step 102, a 3D multiview image is reconstructed using the 2D stereo images. In some embodiments, the 3D representation has a wide FOV. In the step 104, the 2D or 3D images are displayed and/or analyzed. In some embodiments, fewer or additional steps are implemented. In some embodiments, the order of the steps is modified.

Figure 2:
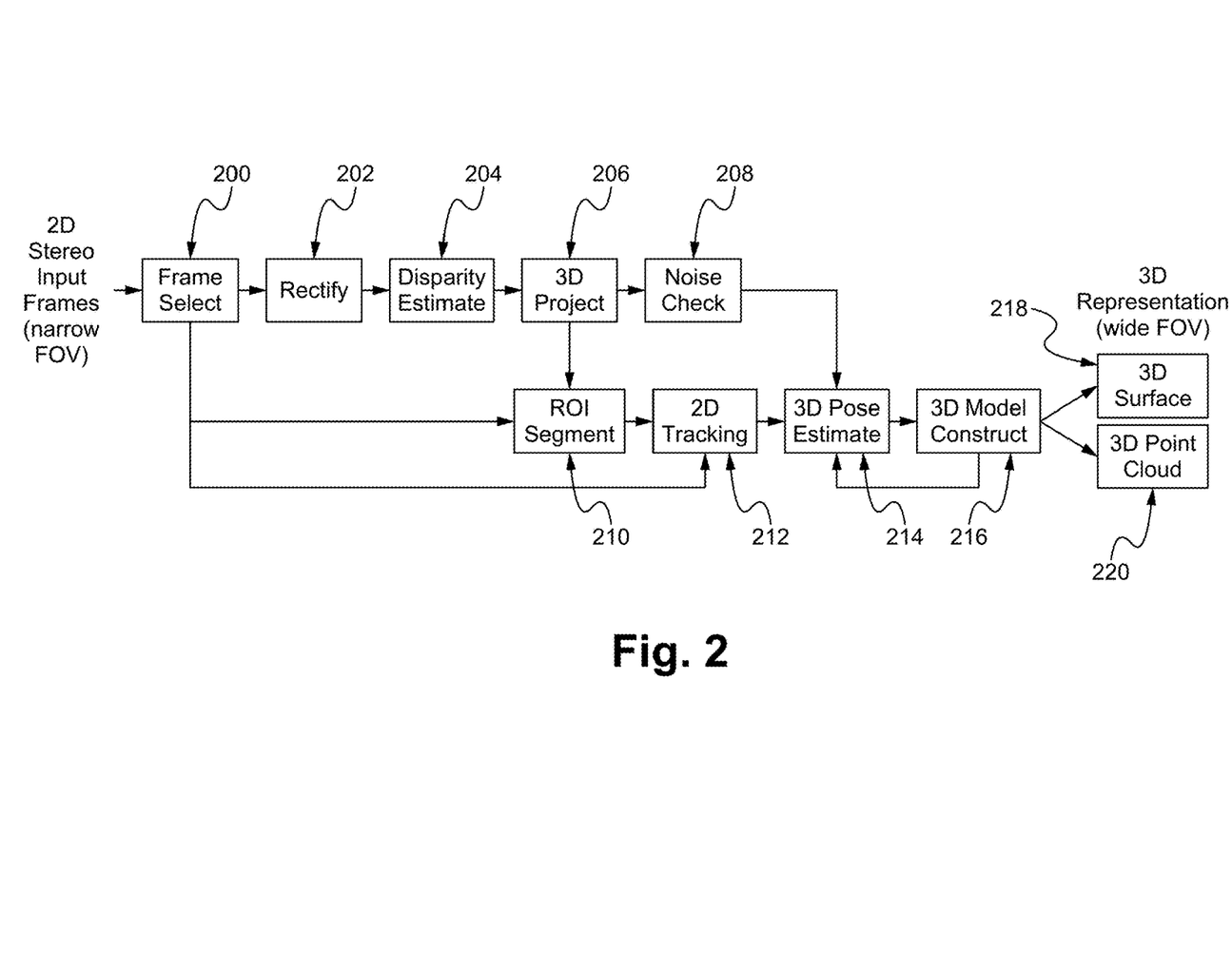
FIG. 2 illustrates a diagram of reconstructing a 3D multiview image using the 2D stereo images according to some embodiments.

FIG. 2 illustrates a diagram of reconstructing a 3D multiview image using the 2D stereo images according to some embodiments. The 2D stereo input frames (narrow FOV) are received. In the step 200, a frame is selected for speedup. In some embodiments, the step 200 is optional. In the step 202, an image or the selected frame is rectified to project the images onto a common image plane. In the step 204, an estimate of the disparity between the images is calculated. In the step 206, a 3D representation is projected. In some embodiments, the steps 202-206 are part of a standard 3D stereo reconstruction pipeline. In the step 208, a noise check is implemented. The noise check is able to be implemented in any manner such as determining an amount of noise in the frame and comparing the amount of noise with a threshold, and if the amount of noise is above the threshold, then the frame is discarded. In some embodiments, the step 208 is optional. In some embodiments, after the step 208, the process goes to the step 214. In the step 210, a Region of Interest (ROI) in the image is selected. For example, only part (e.g., an ROI) of the frame is selected. In some embodiments, the step 210 is optional. In the step 212, 2D pixel tracking (e.g., optical flow) across neighboring frames is implemented. For example, by tracking movement of the pixels in 2D, it is possible to determine which direction a 2D object is moving. In the step 214, a 3D pose is estimated. In some embodiments, the 2D tracked points are mapped to 3D coordinates for a 3D pose estimate. The 3D pose is estimated by tracked 2D features via a RANdom SAmple Consensus (RANSAC) algorithm with a 3D rigid transform (rotation, translate). RANSAC is modified by checking an error of a frame-model registration. In the step 216, a 3D model is constructed based on the estimated 3D pose. The 3D model is constructed by integrating all transformed input sequentially. For example, the 3D poses are combined to generate a 3D model. The desired 3D output is constructed based on application via 3D surface rendering or sampling. In some embodiments, the 3D model is constructed in a different manner. In the step 218, a 3D surface is generated. In the step 220, a 3D point cloud is generated. In some embodiments, either or both of the steps 218 and 220 are optional. In some embodiments, fewer or additional steps are implemented. In some embodiments, the order of the steps is modified.

Figure 3:
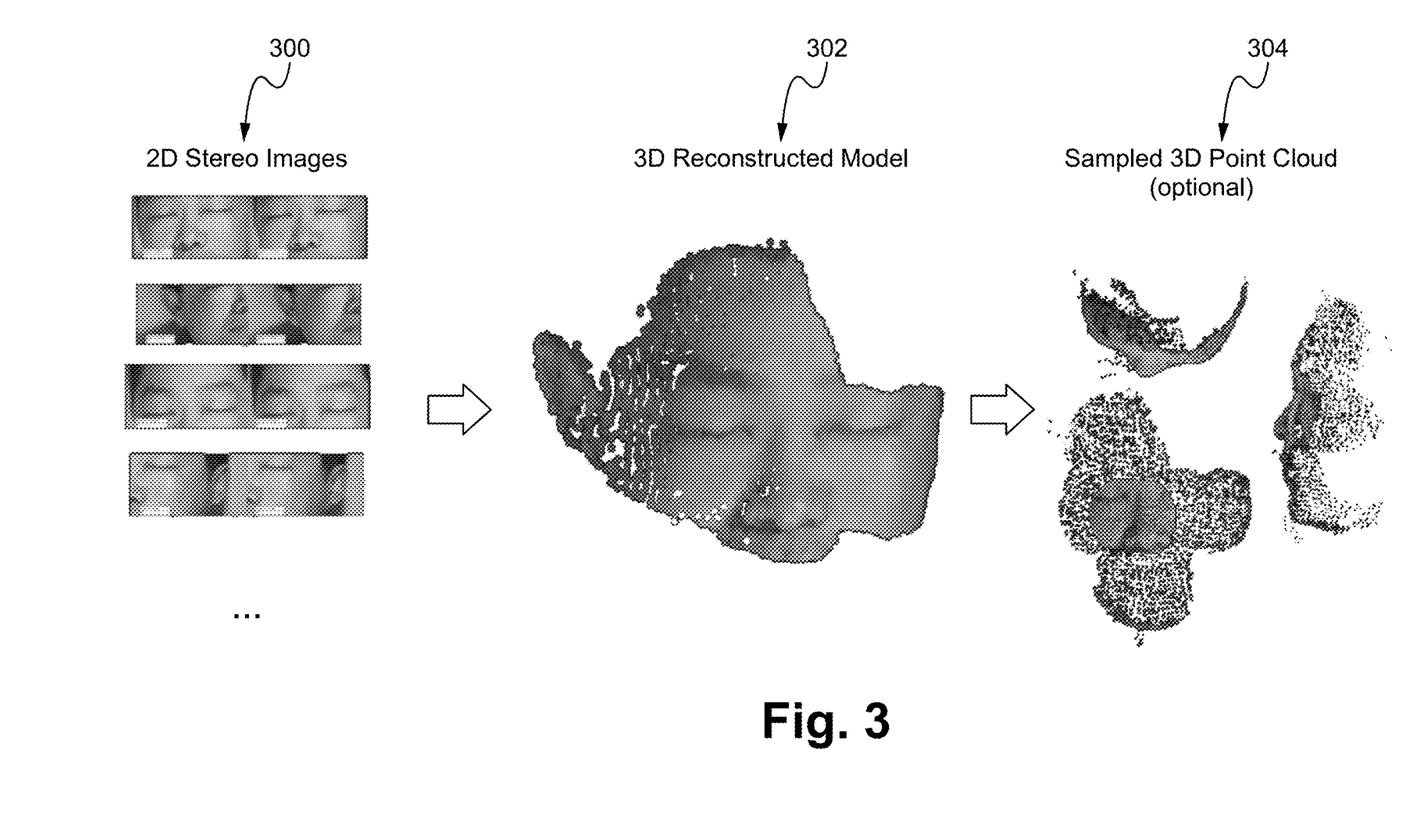
FIG. 3 illustrates exemplary results of the multiview reconstruction according to some embodiments.

FIG. 3 illustrates exemplary results of the multiview reconstruction according to some embodiments. The 3D multiview reconstruction method uses 2D stereo images 300 to generate a 3D reconstructed model 302 and/or a sampled 3D point cloud 304 as described herein.

Figure 4:
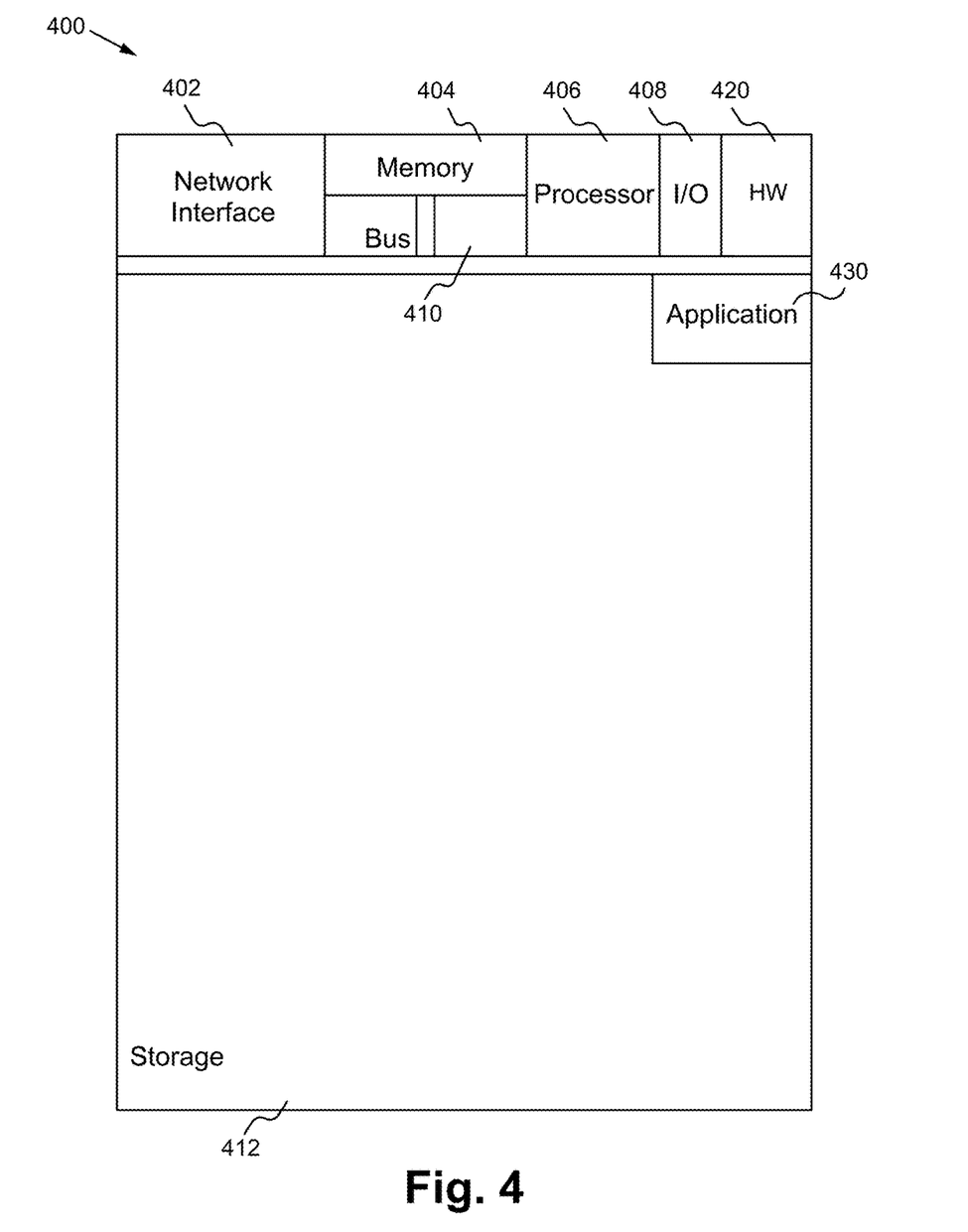
FIG. 4 illustrates a block diagram of an exemplary computing device configured to implement the 3D multiview reconstruction method according to some embodiments.

FIG. 4 illustrates a block diagram of an exemplary computing device configured to implement the 3D multiview reconstruction method according to some embodiments. The computing device 400 is able to be used to acquire, store, compute, process, communicate and/or display information such as images and videos. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. 3D multiview reconstruction application(s) 430 used to perform the inter-patient brain registration method are likely to be stored in the storage device 412 and memory 404 and processed as applications are typically processed. More or fewer components shown in FIG. 4 are able to be included in the computing device 400. In some embodiments, 3D multiview reconstruction method hardware 420 is included. Although the computing device 400 in FIG. 4 includes applications 430 and hardware 420 for the 3D multiview reconstruction method, the 3D multiview reconstruction method is able to be implemented on a computing device in hardware, firmware, software or any combination thereof. For example, in some embodiments, the 3D multiview reconstruction method applications 430 are programmed in a memory and executed using a processor. In another example, in some embodiments, the 3D multiview reconstruction method hardware 420 is programmed hardware logic including gates specifically designed to implement the 3D multiview reconstruction method.

In some embodiments, the 3D multiview reconstruction method application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch) or any other suitable computing device.

Figure 5:
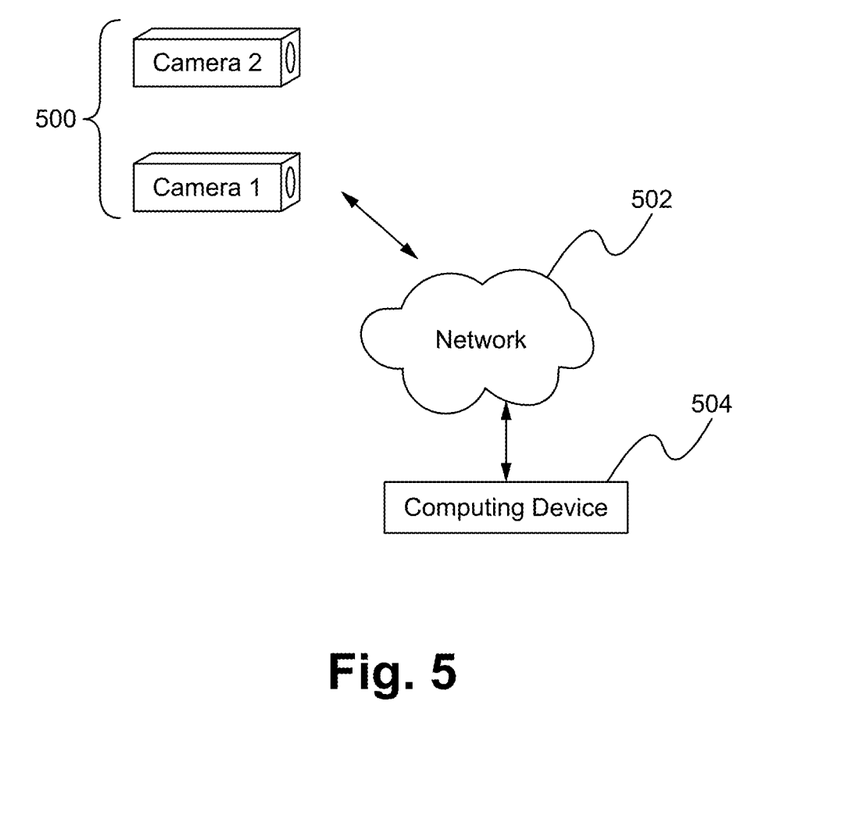
FIG. 5 illustrates a diagram of a network of devices according to some embodiments.

FIG. 5 illustrates a diagram of a network of devices according to some embodiments. A plurality of cameras 500 (e.g., a stereo pair) are utilized to acquire image/video content. The image/video content is transmitted through a network 502 (e.g., the Internet, a cellular network or any other network) to a computing device 504. In some embodiments, the content is transmitted to the computing device directly without a network. The computing device 504 is configured to perform 3D multiview reconstruction described herein. The computing device 504 is able to be any device such as a server, a personal computer, a smart phone, or any of the devices described herein or any combination of devices described herein. In some embodiments, the computing device 504 is one or more of the plurality of cameras 500. In other words, the camera(s) 500 implements the 3D multiview reconstruction method.

To utilize the 3D multiview reconstruction method described herein, images are acquired using a stereo pair of cameras. The images are then processed using the 3D multiview reconstruction. The processing is able to occur automatically without human involvement.

In operation, the 3D multiview reconstruction method enables efficient conversion of 2D images with a narrow FOV to 3D content. By tracking in 2D for speed and using model construction in 3D for accuracy, a better result is achieved. The 3D multiview reconstruction method is able to be used in 3D object and scene modeling for augmented reality, 3D printing, virtual reality and localization and mapping.

Some Embodiments of Method for 3D Multiview Reconstruction by Feature Tracking and Model Registration 1. A method programmed in a non-transitory memory of a device comprising:
   acquiring one or more 2D stereo images;
   reconstructing a 3D multiview image using the one or more 2D stereo images; and
   displaying the 3D multiview image.
2. The method of clause 1 wherein acquiring the one or more 2D stereo images includes utilizing a plurality of cameras to capture the one or more 2D stereo images.
3. The method of clause 1 wherein acquiring the one or more 2D stereo images includes downloading the one or more 2D stereo images from a server.
4. The method of clause 1 wherein the one or more 2D stereo images have a narrow field of view.
5. The method of clause 1 wherein reconstructing the 3D multiview image includes:
   rectifying the one or more images;
   estimating a disparity between images;
   implementing 2D pixel tracking across neighboring frames;
   estimating a 3D pose by mapping tracked 2D pixels to 3D coordinates; and
   constructing a 3D model based on the 3D pose.
6. The method of clause 5 wherein reconstructing the 3D multiview image includes:
   selecting a frame of the one or more images for speedup;
   performing a noise check to discard an image of the one or more images if noise of the image is above a threshold; and
   selecting a region of interest in the one or more images for speedup.
7. The method of clause 1 wherein the 3D image comprises a 3D surface.
8. The method of clause 1 wherein the 3D image comprises a 3D point cloud.
9. An apparatus comprising:
   a non-transitory memory for storing an application, the application for:
   acquiring one or more 2D stereo images;
   reconstructing a 3D multiview image using the one or more 2D stereo images; and
   displaying the 3D multiview image; and
   a processing component coupled to the memory, the processing component configured for processing the application.
10. The apparatus of clause 9 wherein acquiring the one or more 2D stereo images includes utilizing a plurality of cameras to capture the one or more 2D stereo images.
11. The apparatus of clause 9 wherein acquiring the one or more 2D stereo images includes downloading the one or more 2D stereo images from a server.
12. The apparatus of clause 9 wherein the one or more 2D stereo images have a narrow field of view.
13. The apparatus of clause 9 wherein reconstructing the 3D multiview image includes:
    rectifying the one or more images;
    estimating a disparity between images;
    implementing 2D pixel tracking across neighboring frames;
    estimating a 3D pose by mapping tracked 2D pixels to 3D coordinates; and
    constructing a 3D model based on the 3D pose.
14. The apparatus of clause 13 wherein reconstructing the 3D multiview image includes:
    selecting a frame of the one or more images for speedup;
    performing a noise check to discard an image of the one or more images if noise of the image is above a threshold; and
    selecting a region of interest in the one or more images for speedup.
15. The apparatus of clause 9 wherein the 3D image comprises a 3D surface.
16. The apparatus of clause 9 wherein the 3D image comprises a 3D point cloud.
17. A system comprising:
    a plurality of cameras for acquiring one or more 2D stereo images; and
    a computing device configured for:
    receiving the one or more 2D stereo images;
    reconstructing a 3D multiview image using the one or more 2D stereo images; and
    displaying the 3D multiview image.
18. The system of clause 17 wherein acquiring the one or more 2D stereo images includes utilizing a plurality of cameras to capture the one or more 2D stereo images.
19. The system of clause 17 wherein acquiring the one or more 2D stereo images includes downloading the one or more 2D stereo images from a server.
20. The system of clause 17 wherein the one or more 2D stereo images have a narrow field of view.
21. The system of clause 17 wherein reconstructing the 3D multiview image includes:
    rectifying the one or more images;
    estimating a disparity between images;
    implementing 2D pixel tracking across neighboring frames;
    estimating a 3D pose by mapping tracked 2D pixels to 3D coordinates; and
    constructing a 3D model based on the 3D pose.
22. The system of clause 21 wherein reconstructing the 3D multiview image includes:
    selecting a frame of the one or more images for speedup;
    performing a noise check to discard an image of the one or more images if noise of the image is above a threshold; and selecting a region of interest in the one or more images for speedup.

23. The system of clause 17 wherein the 3D image comprises a 3D surface.

24. The system of clause 17 wherein the 3D image comprises a 3D point cloud.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   acquiring one or more 2D stereo images;
   reconstructing a 3D multiview image using the one or more 2D stereo images, wherein reconstructing the 3D multiview image includes:
   rectifying the one or more images;
   estimating a disparity between images;
   implementing 2D pixel tracking across neighboring frames;
   estimating a 3D pose by mapping tracked 2D pixels to 3D coordinates; and
   constructing a 3D model based on the 3D pose; and
   displaying the 3D multiview image.

2. The method of claim 1 wherein acquiring the one or more 2D stereo images includes utilizing a plurality of cameras to capture the one or more 2D stereo images.

3. The method of claim 1 wherein acquiring the one or more 2D stereo images includes downloading the one or more 2D stereo images from a server.

4. The method of claim 1 wherein the one or more 2D stereo images have a narrow field of view.

5. The method of claim 1 wherein reconstructing the 3D multiview image includes: selecting a frame of the one or more images;
   performing a noise check to discard an image of the one or more images if noise of the image is above a threshold; and
   selecting a region of interest in the one or more images.

6. The method of claim 1 wherein the 3D image comprises a 3D surface.

7. The method of claim 1 wherein the 3D image comprises a 3D point cloud.

8. An apparatus comprising:
   a non-transitory memory for storing an application, the application for:
   acquiring one or more 2D stereo images;
   reconstructing a 3D multiview image using the one or more 2D stereo images, wherein reconstructing the 3D multiview image includes:
   rectifying the one or more images;
   estimating a disparity between images;
   implementing 2D pixel tracking across neighboring frames;
   estimating a 3D pose by mapping tracked 2D pixels to 3D coordinates; and
   constructing a 3D model based on the 3D pose; and
   displaying the 3D multiview image; and
   a processing component coupled to the memory, the processing component configured for processing the application.

9. The apparatus of claim 8 wherein acquiring the one or more 2D stereo images includes utilizing a plurality of cameras to capture the one or more 2D stereo images.

10. The apparatus of claim 8 wherein acquiring the one or more 2D stereo images includes downloading the one or more 2D stereo images from a server.

11. The apparatus of claim 8 wherein the one or more 2D stereo images have a narrow field of view.

12. The apparatus of claim 8 wherein reconstructing the 3D multiview image includes: selecting a frame of the one or more images;
    performing a noise check to discard an image of the one or more images if noise of the image is above a threshold; and
    selecting a region of interest in the one or more images.

13. The apparatus of claim 8 wherein the 3D image comprises a 3D surface.

14. The apparatus of claim 8 wherein the 3D image comprises a 3D point cloud.

15. A system comprising:
    a plurality of cameras for acquiring one or more 2D stereo images; and
    a computing device configured for:
    receiving the one or more 2D stereo images;
    reconstructing a 3D multiview image using the one or more 2D stereo images, wherein reconstructing the 3D multiview image includes:
    rectifying the one or more images;
    estimating a disparity between images;
    implementing 2D pixel tracking across neighboring frames;
    estimating a 3D pose by mapping tracked 2D pixels to 3D coordinates; and
    constructing a 3D model based on the 3D pose; and
    displaying the 3D multiview image.

16. The system of claim 15 wherein acquiring the one or more 2D stereo images includes utilizing a plurality of cameras to capture the one or more 2D stereo images.

17. The system of claim 15 wherein acquiring the one or more 2D stereo images includes downloading the one or more 2D stereo images from a server.

18. The system of claim 15 wherein the one or more 2D stereo images have a narrow field of view.

19. The system of claim 15 wherein reconstructing the 3D multiview image includes: selecting a frame of the one or more images;
    performing a noise check to discard an image of the one or more images if noise of the image is above a threshold; and
    selecting a region of interest in the one or more images.

20. The system of claim 15 wherein the 3D image comprises a 3D surface.

21. The system of claim 15 wherein the 3D image comprises a 3D point cloud.

* * * * *